March 17, 1970     J. N. MONROE     3,501,639
SUBMARINE DETECTION

Filed Feb. 13, 1959     2 Sheets-Sheet 1

INVENTOR
John N. Monroe

BY Stevens, Davis, Miller & Mosher
ATTORNEYS

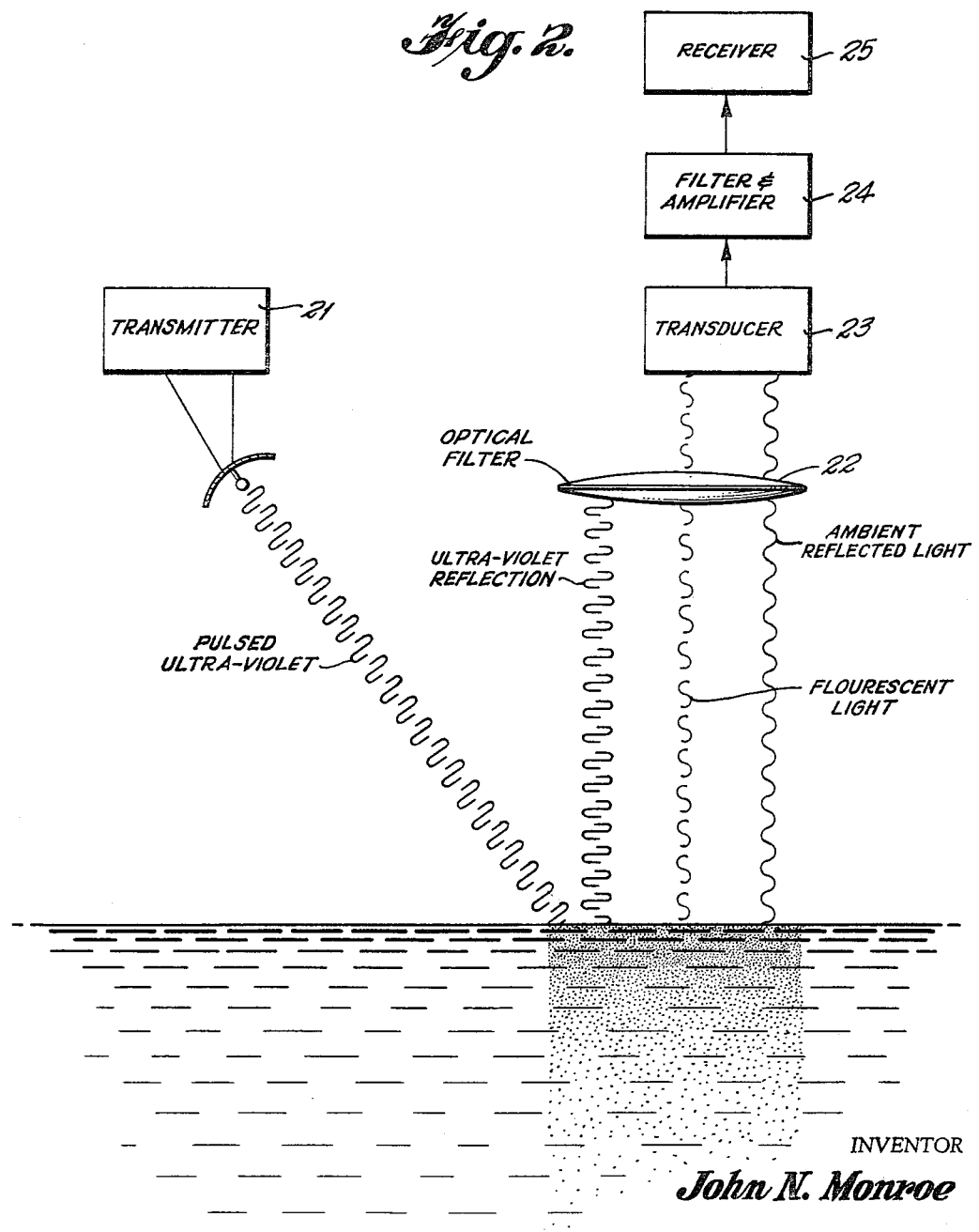

United States Patent Office 3,501,639
Patented Mar. 17, 1970

3,501,639
SUBMARINE DETECTION
John N. Monroe, La Crescenta, Calif., assignor, by mesne assignments, to TRW Inc., a corporation of Ohio
Continuation-in-part of application Ser. No. 724,473, Mar. 27, 1958. This application Feb. 13, 1959, Ser. No. 793,016
Int. Cl. G01t 1/16; G01d 7/00
U.S. Cl. 250—83.3     1 Claim This invention relates to a method of detecting submarines making use of the phenomenon of fluorescence. This application is a continuation-in-part of the copending application Ser. No. 724,473 of John N. Monroe filed Mar. 27, 1958, entitled "Detecting With Ultraviolet Light."

The advent of missile launching submarines has made the science of anti-submarine warfare and, in particular, submarine detection extremely critical. The submarine detection systems of the prior art such as Sonar are inadequate to provide a satisfactory defense against the missile launching submarine as they are too limited in the area which they can search practically. The present invention provides a practical method which permits positive detection from the air and thus will allow searches to be made over wide areas.

When a submarine travels under water, it affects the fluorescence of the surface water under which it passes. According to the invention, the surface of the water where a submarine is suspected is irradiated with ultraviolet light. This ultraviolet irradiation will energize the fluorescent parts and contents of the surface water, which parts and contents will then emit visible light. Since the fluorescence of this surface water under which the submarine passes will be affected, the path or track of the submarine can be detected by its contrast with the surrounding surface water and the emitted light caused by the ultraviolet irradiation will delineate this contrast. Because some of the light emanating from the surface water will be reflected ambient light, the irradiating ultraviolet light is pulsed. The visible light emanating from the surface is detected and its intensity is transduced into an electrical waveform. The component of this electrical waveform which is caused by the fluorescent light emanating from the surface water will have the same frequency as the pulsed ultraviolet light. The component of the electrical waveform is caused by the ambient light reflected from the surface water, will be for the most part, DC or very low frequency and will not vary at the same frequency as the fluorescent light stimulated by the pulsed ultraviolet light. Thus by filtering the transduced electrical signal, the undesirable components of the transduced electrical signal which are caused by ambient light are eliminated. The filtered detected signal will then give a clear indication of the presence of a submarine path or track.

Further objects and advantages of the present invention will become apparent as the following detailed description of a preferred embodiment of the invention unfolds and when taken in conjunction with the drawings wherein:

FIGURE 2 illustrates in block form the apparatus used in the method and how the effect of the ambient light is eliminated.

Figure 1:
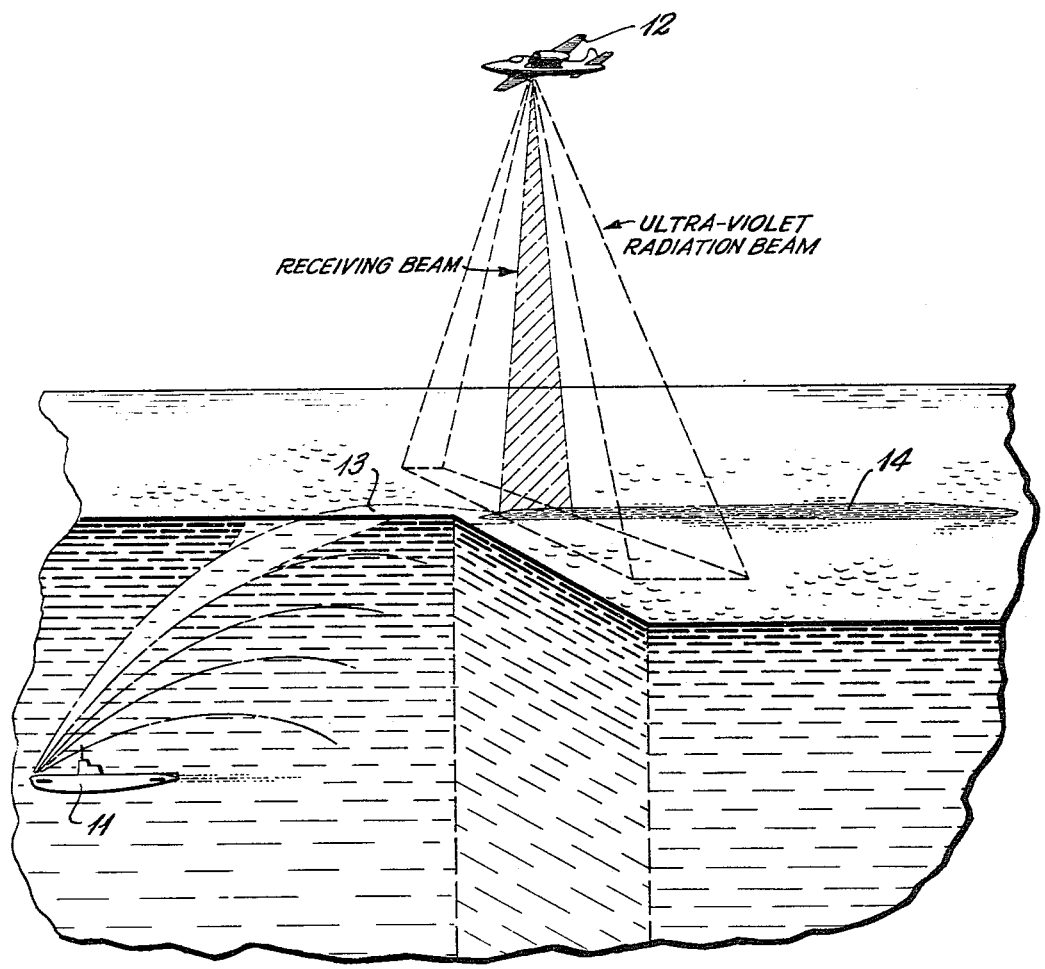
FIGURE 1 illustrates generally how the method is carried out.

The invention makes use of the fluorescent properties of the surface water of the ocean and its contents. This fluorescence is for the most part caused by minute organisms which are found in every ounce of sea water and which are particularly concentrated near the surfaces. These minute organisms are known as plankton. Sound waves originating from beneath the surface of the plankton-containing water cause a large percentage of the floating organisms to bioluminesce. The products of oxidation of bioluminesce are fluorescent and when exposed to ultraviolet irradiation will emit visible light.

Due to the normal and constant motion of the sea, there is always some agitation of the plankton and thus there will always be a low level of fluorescence. This level is increased when sound waves from a submerged body are applied to the plankton. After about 15 minutes of this increased agitation the plankton becomes exhausted and lose their ability to produce fluorescent material. Therefore, when a submarine travels beneath the ocean surface it will leave a fluorescent path or a track of a short length followed by a longer track which is distinguished from the surrounding ocean water by exhibiting almost no fluorescence compared to the normal level of fluorescence which will be exhibited by the water not in the submarine track. Thus the submarine track can be detected by means of ultraviolet irradiation which will cause the fluorescent parts of the surface ocean water to emit visible light.

FIGURE 1 illustrates how the method is carried out. The submarine 11 passing underneath the surface of the water will generate sound waves which will travel up to the surface. These sound waves will at first cause bioluminesce of the organisms floating near the surface. The products of this bioluminesce will then leave a track 13 which is fluorescent. This fluorescent track will be followed by a longer track 14 which can be distinguished from the surrounding surface water by the fact that it exhibits almost no fluorescence. An aircraft 12, searching for the submarines can detect these tracks by irradiating the ocean surface with ultraviolet light and then detecting the visible light emanating from the surface. The fluorescence will be determined by how much visible light is given off in response to the ultraviolet irradiation. Since the fluorescence of the track will be different from the surrounding ocean water, the track can be detected by the contrast of the light emitted therefrom with the light from the surrounding water. The track 13 will emit more light in response to the ultraviolet stimulus in comparison to the surrounding surface water and the track 14 will emit less light in comparison with the surrounding surface water. This detection of the light emitted from the surface water as a result of the ultraviolet irradiation will reveal the track or path of the submarine which in turn will indicate the position of the submarine.

The ultraviolet beam irradiating the surface water from the aircraft 12 is scanned in a direction perpendicular to the direction of travel of the aircraft. This scanning increases the area which can be searched and makes the detection of the submarine track easier as the contrast of the fluorescence of the track with the fluorescence of the surrounding water may be more easily detected.

The equipment used in this operation is similar to that disclosed in the copending application of John N. Monroe, Ser. No. 628,824, filed Dec. 17, 1956 and Ser. No. 724,473 filed Mar. 27, 1958. As shown in FIGURE 2, a transmitter 21 generates pulsed ultraviolet light, which is beamed to irradiate the surface of the ocean where a submarine is being searched. This pulsed ultraviolet light will cause the fluorescent parts and contents of the surface water to emit visible light. This emitted visible light will vary in intensity at the same frequency as that of the pulsed ultraviolet light. The light emanating from the surface is detected by first passing it through an optical filter 22, which eliminates the reflected ultraviolet light from the detected light. The remaining light passing through the optical filter 22 is transduced by transducer 23 into an electrical signal which has an amplitude proportional to the instantaneous intensity of the light passing through optical filter 22. This electrical signal is applied to an electrical filter and amplifier 24. The electrical filter is designed to eliminate all components from the signal which are not at the frequency at which the ultraviolet light is pulsed. The components of the electrical signal output of the transducer 23 which are caused by ambient light are thus effectively eliminated as these components will be for the most part DC or very low frequency and at any rate will not have the same frequency as the pulsed ultraviolet light. Since the ambient light is almost entirely DC or very low frequency, the electrical filter need merely be a high pass filter which will pass signals at the frequency of the pulsed ultraviolet light but which will eliminate DC and other low frequency components. The electrical filter thus performs the step of eliminating from the detected light the effect of that component, the intensity of which varies at a rate below a selected frequency which is below the frequency of the pulse ultraviolet light.

The filtered electrical output signal of the filter and amplifier 24 will thus be only that component which is due to the emitted light from the fluorescent parts of the surface water and contents thereof. Thus the magnitude of this electrical signal will give a clear indication of the fluorescent properties of the surface water. This electrical signal is applied to the receiver 25 which gives an indication to the operator of the magnitude of the fluorescence. This receiver, for example, could be a simple oscilloscope whose sweep is synchronized with the sweep of the scanning ultraviolet beam or it may be a scope similar to the scope used in radar receiving equipment. The indication given by the receiver would thus clearly indicate the presence and position of the track of a submarine.

The above description is of a preferred embodiment of the invention and many modifications can be made thereto without departing from the spirit and scope of the invention which is to be limited only as defined in the appended claims.

What is claimed is:

1. A method of detecting submarine objects comprising the steps of causing the fluorescent parts and contents of the surface water of the area being searched for submarine objects to fluoresce and thereby emit visible light having an intensity which varies at a first predetermined frequency in the presence of ambient light, detecting visible light emanating from said surface water, transducing the detected light into an electrical signal having an amplitude proportional to the instantaneous intensity of the detected light, electrically filtering the electrical signal to eliminate all components of said electrical signal which are below a second predetermined frequency, said second predetermined frequency being below said first predetermined frequency, and indicating the resultant signal on a receiver to show the presence of a submarine object.

References Cited

UNITED STATES PATENTS

| | | |
|---|---|---|
| 2,237,193 | 4/1941 | Mosbsby. |
| 2,412,165 | 12/1946 | McDermott. |
| 2,710,924 | 6/1955 | Morrison et al. |
| 2,241,154 | 5/1941 | Neufeld. |
| 2,263,108 | 11/1941 | Stuart. |
| 2,334,475 | 11/1943 | Claudet. |
| 2,342,273 | 2/1944 | Hayward. |
| 2,346,481 | 4/1944 | Garrison. |
| 2,423,885 | 7/1947 | Hammond _____ 244—14.3 |
| 2,442,298 | 5/1948 | Liston. |
| 2,617,945 | 11/1952 | Lord. |
| 2,941,085 | 6/1960 | Cuff. |
| 2,028,475 | 1/1936 | Rockwell. |

RODNEY D. BENNETT, Jr., Primary Examiner

D. C. KAUFMAN, Assistant Examiner

U.S. Cl. X.R.

250—71, 72; 340—4